(12) United States Patent
Beckley

(10) Patent No.: US 10,710,865 B1
(45) Date of Patent: Jul. 14, 2020

(54) NITROGEN INFUSING NON-ALCOHOLIC CARBONATED BEVERAGES

(71) Applicant: Levi Travis Beckley, Louisville, KY (US)

(72) Inventor: Levi Travis Beckley, Louisville, KY (US)

( * ) Notice: Subject to any disclaimer, the term of this patent is extended or adjusted under 35 U.S.C. 154(b) by 17 days.

(21) Appl. No.: 15/977,474

(22) Filed: May 11, 2018

Related U.S. Application Data

(60) Provisional application No. 62/622,243, filed on Jan. 26, 2018.

(51) Int. Cl.
*B67D 1/04* (2006.01)
*B67D 1/08* (2006.01)
*B67D 1/12* (2006.01)

(52) U.S. Cl.
CPC ......... *B67D 1/0406* (2013.01); *B67D 1/0884* (2013.01); *B67D 1/1284* (2013.01); *B67D 2001/0487* (2013.01); *B67D 2001/0822* (2013.01)

(58) Field of Classification Search
CPC .. B67D 1/0406; B67D 1/0884; B67D 1/1284; B67D 2001/0822; B67D 2001/0487
See application file for complete search history.

(56) References Cited

U.S. PATENT DOCUMENTS

| 6,138,995 | A  | * | 10/2000 | Page | B67D 1/0077 210/321.8 |
| 8,438,969 | B2 | * | 5/2013 | Gold | B01F 3/04808 261/102 |
| 9,623,383 | B1 | * | 4/2017 | Kleinrichert | B01F 3/04808 |

* cited by examiner

*Primary Examiner* — Kevin R Kruer

(57) ABSTRACT

This invention is a method by which four separate variables are manipulated in a manner that creates a process to force nitrogen into non-alcoholic carbonated beverages in a pressure rated vessel that is equipped to introduce the gas through the bottom of the pressure rated vessel. The four separate elements in this invention are Temperature, Pressure, Time, and Agitation. The purpose of this invention is to achieve a total of 30% total gas absorption of Carbon Dioxide and 70% total gas absorption of Nitrogen into Non-Alcoholic beverages including but not limited to Soda, Tea, Energy Drinks, Horchata, Fruit Juices, Water, Mineral Water, Fruit Juice Cocktails, Cocktail Mixers, Switchel, Lemonade, Limeade, vitamin drinks, orangeade, hang over remedies, and sports drinks, excluding all coffee and flavored coffee drinks.

1 Claim, No Drawings

NITROGEN INFUSING NON-ALCOHOLIC CARBONATED BEVERAGES

CROSS-REFERENCE TO RELATED APPLICATIONS

62/309,006, U.S. Pat. No. 9,245,403

STATEMENT REGARDING FEDERALLY SPONSORED RESEARCH OR DEVELOPMENT

N/A

THE NAMES OF PARTIES TO A JOINT RESEARCH AGREEMENT

N/A

INCORPORATION-BY-REFERENCE OF MATERIAL SUBMITTED ON a COMPACT DISC OR AS a TEXT FILE VIA THE ELECTRONIC FILING SYSTEM (EFS-WEB)

N/A

STATEMENT REGARDING PRIOR DISCLOSURES BY THE INVENTOR OR THE JOINT INVENTOR

N/A

BACKGROUND OF THE INVENTION

Previously we have seen carbonated beverages that have been force nitrogenated through in line, on demand mixing. While that achieves a nitrogenation process, it requires additional equipment to be purchased which could be considered by some to be cost prohibitive. This method of Nitrogen infusing non-alcoholic carbonated beverages, achieves nitrogenation of non-alcoholic carbonated beverages in any pressure rated vessel without the requirement of purchasing any additional equipment, and can be achieved in most pressure rated vessels that are equipped to receive gas at the bottom of said vessel.

(1) Field of the Invention
Beverage Industry
(2) Description of Related Art Including Information Disclosed Under 37 CRF 1.97 and 1.98
N/A

BRIEF SUMMARY OF THE INVENTION

This is a method of manipulating temperature, pressure, time, and agitation to achieve a process that forces Nitrogen to infuse into non-alcoholic carbonated beverages.

BRIEF DESCRIPTION OF THE SEVERAL VIEWS OF THE DRAWING(S)

N/A

DETAILED DESCRIPTION OF THE INVENTION

1. Temperature: This process can only happen at 40 degrees Fahrenheit or below, performing this process at a lower temperatures make the process more efficient.

2. Pressure: The pressure at which one uses to force either gas into the non-alcoholic beverage is specific to which gas you are forcing into said beverage, where in Carbon Dioxide has to be forced into said beverage first at a pressure that is 30 percent of the total Nitrogen pressure, which is secondly forced into said beverage 3. Time: The amount of time it takes to achieve said process, is relative to the pressure rating of the vessel in which one is forcing the two gases into said beverage, a vessel with a higher pressure rating can achieve this process in a smaller amount of time, where in a vessel with a smaller amount of pressure rating will take more time, i.e. a vessel with a pressure rating of 60 psi would take 3 days to first infuse Carbon Dioxide into said beverage at 18 psi with the aid of agitation, further comprising, secondly forcing the Nitrogen into said 4. Agitation: Agitating the liquid helps to further force the Carbon Dioxide and Nitrogen into said beverage. Achieving agitation can be as easy as shaking a keg or as complex as rotating a paddle inside of a large pressure rated tank. Furthermore, the more agitation that is applied to said beverage reduces the overall amount of time of the entire process.

The invention claimed is:

1. A method of nitrogen infusing non-alcoholic carbonated beverages comprising;

a) in a 60 pounds per square inch pressure rated vessel, infusing carbon dioxide into a non-alcoholic beverage for three days at a temperature of 40 degrees Fahrenheit or below and a pressure of 18 pounds per square inch using a pressure regulated tank of carbon dioxide with the aid of agitation, and b) subsequently, in said 60 pounds per square inch pressure rated vessel, infusing nitrogen into said beverage for one day at a temperature of 40 degrees Fahrenheit or below and a pressure of 60 pounds per square inch using a pressure regulated tank of nitrogen with the aid of agitation.

* * * * *